United States Patent [19]

Long

[11] Patent Number: 5,115,762

[45] Date of Patent: May 26, 1992

[54] GABLE STYLE PREFABRICATED DOGHOUSE

[76] Inventor: Ruth I. Long, 10500 Dean St., #42, Bonita Springs, Fla. 33923

[21] Appl. No.: 592,836

[22] Filed: Oct. 4, 1990

[51] Int. Cl.⁵ ............................................. A01K 1/00
[52] U.S. Cl. .................................................... 119/19
[58] Field of Search .................. 119/15, 19, 17, 20; 217/14, 46; 190/21, 107; 52/69, 70, 71

[56]     References Cited
        U.S. PATENT DOCUMENTS

| 785,794 | 3/1905 | Buckingham | 119/19 |
| 1,056,491 | 3/1913 | Biddinger | 217/14 |
| 1,973,029 | 9/1934 | Walston | 119/19 |
| 2,534,492 | 12/1950 | Williams | 119/19 |
| 3,048,147 | 8/1962 | McKean | 119/19 |
| 3,084,667 | 4/1963 | Felhofer et al. | 119/19 |
| 3,280,796 | 10/1966 | Hatcher | 119/19 |
| 3,866,577 | 2/1975 | Mathis | 119/19 |
| 4,085,762 | 4/1978 | O'Brian et al. | 119/19 X |
| 4,109,427 | 8/1978 | O'Brian et al. | 119/19 X |
| 4,195,593 | 4/1980 | Dunn | 119/19 |
| 4,603,658 | 8/1986 | Garnsey | 119/19 |
| 4,793,507 | 12/1988 | Delplanque | 217/14 X |

FOREIGN PATENT DOCUMENTS 52060  3/1911  Switzerland ................. 119/19

Primary Examiner—Gene Mancene
Assistant Examiner—Thomas Price
Attorney, Agent, or Firm—William F. Hamrock

[57]     ABSTRACT

A durable, sturdy, prefabricated gable roof animal structure, such as a dog house, includes seven separate prefabricated sections which can be quickly assembled and dismantled. The assembled structure is rigidly secured internally in place by slip pin fastener hinge mechanisms attached at bevelled edged adjacent sections and attached in combination with hasp fastener mechanisms at adjacent side wall and roof sections. The separated dismantled sections can be compactly stacked one on top of another for shipping or storage.

19 Claims, 7 Drawing Sheets

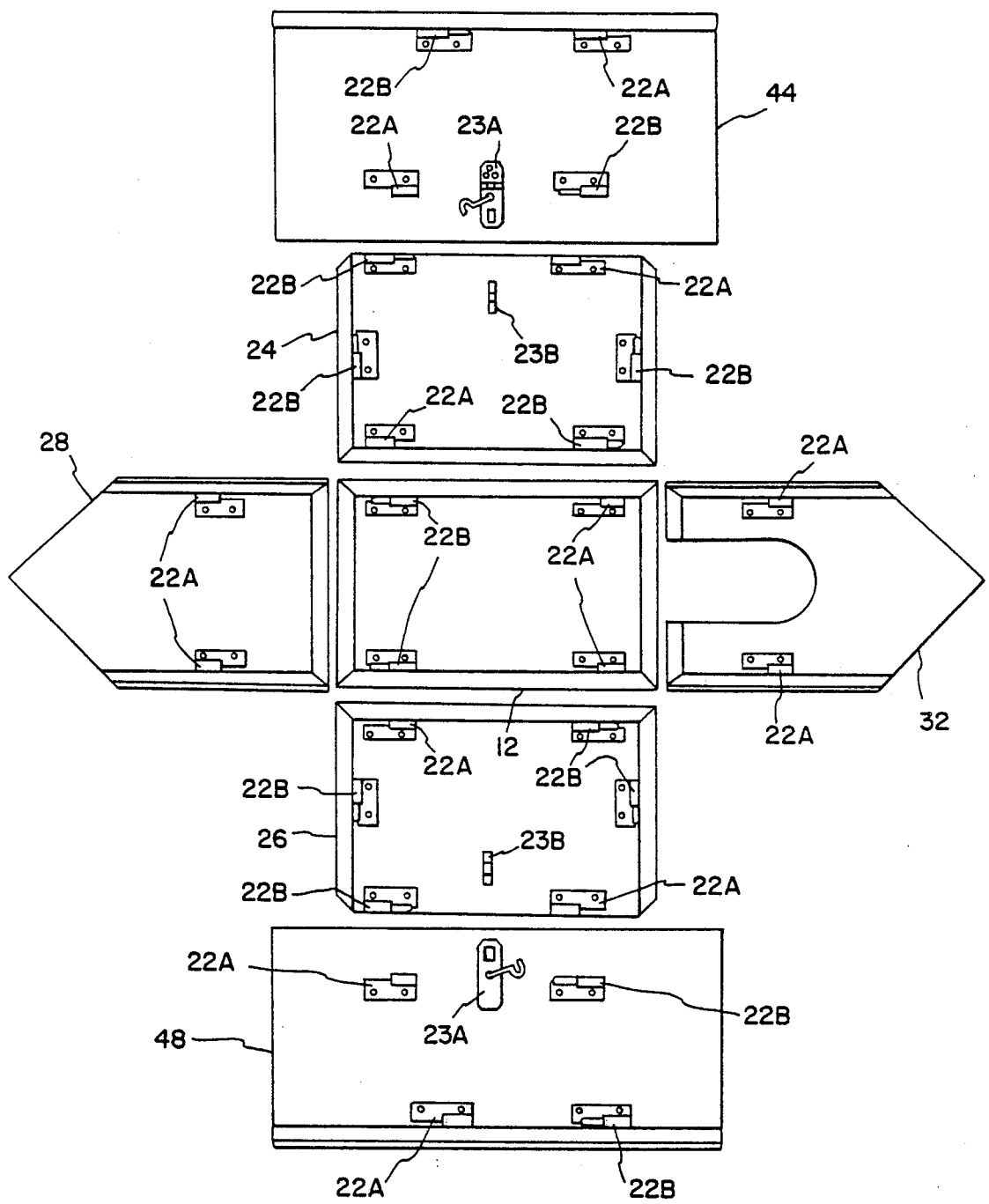

GABLE STYLE PREFABRICATED DOGHOUSE

BACKGROUND OF THE INVENTION

1. Field of the Invention

The invention relates to a dog house or similar animal structure and, in particularm to a double gable style prefabricated doghouse which can be easily assembled and dismantled.

2. Description of the Prior Art

There is a problem in the prior art is obtaining prefabricated dog houses or similar animal structures which are durable, attractive, leak proof, easy to assemble and to dismantle and easy to store and to transport.

Prior U.S. Patents relate to various types of animal shelters. However, many of these suffer from the disadvantages of being difficult to assemble structures that are fragile having poor durability, are difficult to dismantle and form bulky packages which are difficult to store or transport.

SUMMARY OF THE INVENTION

The present invention solves many of the problems and shortcomings of the prior art by providing an attractive durable dog house which can be easily assembled or dismantled from only seven prefabrication sections; a floor, two opposite side walls, two opposite end walls, and two opposite roof sections. These prefabricated sections are easily assembled by simply sliding them together and interlocking with durable metal hinges to help make one solid complete unit.

When assembled, the separable durable hinges as well as two hasp fasteners for the roof have been placed so that the sections are so interlocked as to make the doghouse a solid unit. It can be picked up in any manner without any danger of it coming apart. It does not give the appearance of being able to be taken apart which is one of many unexpected features.

The floor is reinforced, by having a center board across the underside, and is held up off the ground by support blocks which allows air circulation and prevents interior dampness. The blocks are placed so as to give a sturdy foundation to the structure, and an be secured by screws or similar attachment so that they can be removed for transporting and easier compact packaging.

The unit is leakproof because all seams of the roof and side edges, as well as bevelled edge of floor at door openings, are covered with molding for a tight seal.

An added embodiment includes an inner compartment or bedroom of such size that it can be warmed by the body heat of the dog in cold weather.

It is an object of the present invention to provide a prefabricated doghouse which is attractive, durable, leakproof, has good ventilation and does not give the appearance of having been prefabricated.

It is another object of the present invention to provide a prefabricated doghouse which can be easily assembled and dismantled.

It is a further object of the present invention to provide a unassembled or dismantled doghouse with compactly stacked prefabricated sections which are easy to store and to transport.

It is another further object to provide a doghouse made of prefabricated sections that are simply constructed and easy to manufacture.

The above objects are met with the present prefabricated dog house.

BRIEF DESCRIPTION OF THE DRAWINGS

FIG. 7 is a view of the dismantled sections showing how they can be assembled.

DETAILED DESCRIPTION OF THE INVENTION

Figure 1:
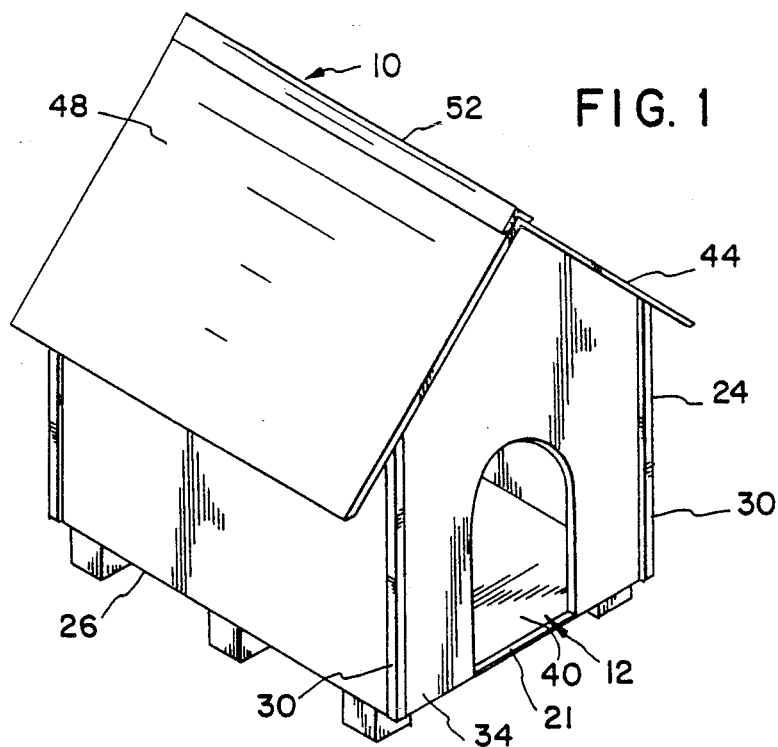
FIG. 1 is a view of the dog house of the invention.

Referring more specifically to the drawings, the prefabricated doghouse 10 is shown in FIG. 1. It is composed of seven prefabricated sections: a floor, two side walls, two end walls and two roof sections as shown in FIGS. 2A and 2B, 3A and 3B, 4A and 4B, and 5A and 5B respectively. It is preferably formed from ½ inch indoor-outdoor plywood or equivalent material with durable male-female hinges securing the sections together. The hinges can be made of metal such as brass or equivalent durable material. An example of the structure of the two preferred hinges is shown in FIGS. 6A and 6B. Male slip pin fastener 22B securely interlocks with female slip pin fastener 22A as seen in FIG. 6A. FIG. 6B shows the hasp fastener and hook lock mechanism 23A and 23B. The hinge fasteners are fastened to the structure with screws, nails or equivalent fastening devices.

The male and female slip pin fasteners and hasp fastener and hook lock mechanisms produce a tight rigid structure which is easily assembled and dismantled and the sections can be compactly stacked for storage or transporting.

Figure 2B:
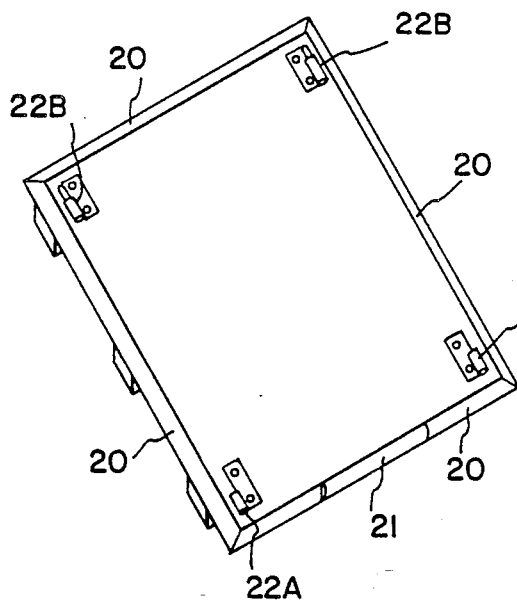
FIGS. 2A and 2B include a bottom view of the underside of the floor section and a top view of the floor section.
Figure 2A:
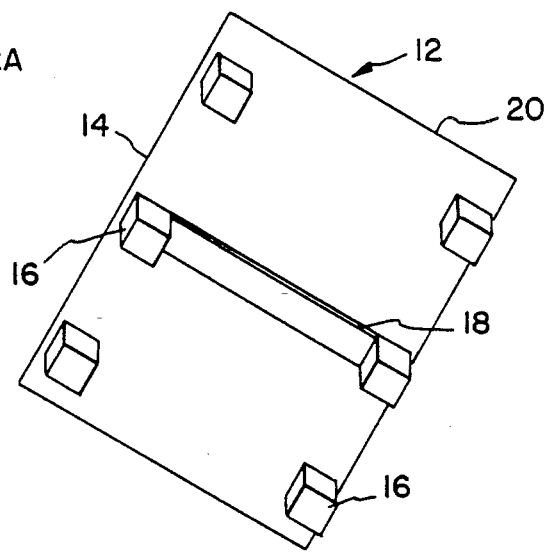

The floor configuration 12 is depicted in FIGS. 2A and 2B. As shown, the floor underside has six blocks 16 made of wood or equivalent material, wherein one block is attached at each of the 4 corners of the floor panel 14 and one block is attached at each of centerboard 18 attached to the underside of the floor panel. Centerboard 18 is attached to the underside center of floor panel 14 for added reinforcement of the floor. Blocks 16 are located inwardly about one inch from the outer edge of the floor panel. The blocks support the structure above the ground and allow free air circulation, decreasing interior dampness and give a sturdy foundation. The blocks can be secured to the underside of the floor panel by screws or equivalent securing mechanism so that they can be removed if desired for easier packaging or storage.

The floor interior, seen in FIG. 2B, is provided with four half slip pin fasteners of metal hinges 22. One each of male (22B) and female (22A) half slip pin fasteners are located on opposite sides of floor panel 14 as shown. The four side edges 20 of the floor panel 14 have corresponding inwardly bevelled edges cut at an angle of about 45 degrees for added tightness and secured fitting of the structure. For added protection to keep the floor from absorbing dampness, moulding 21 can be provided over bevelled edge of floor at door opening.

Figure 3B:
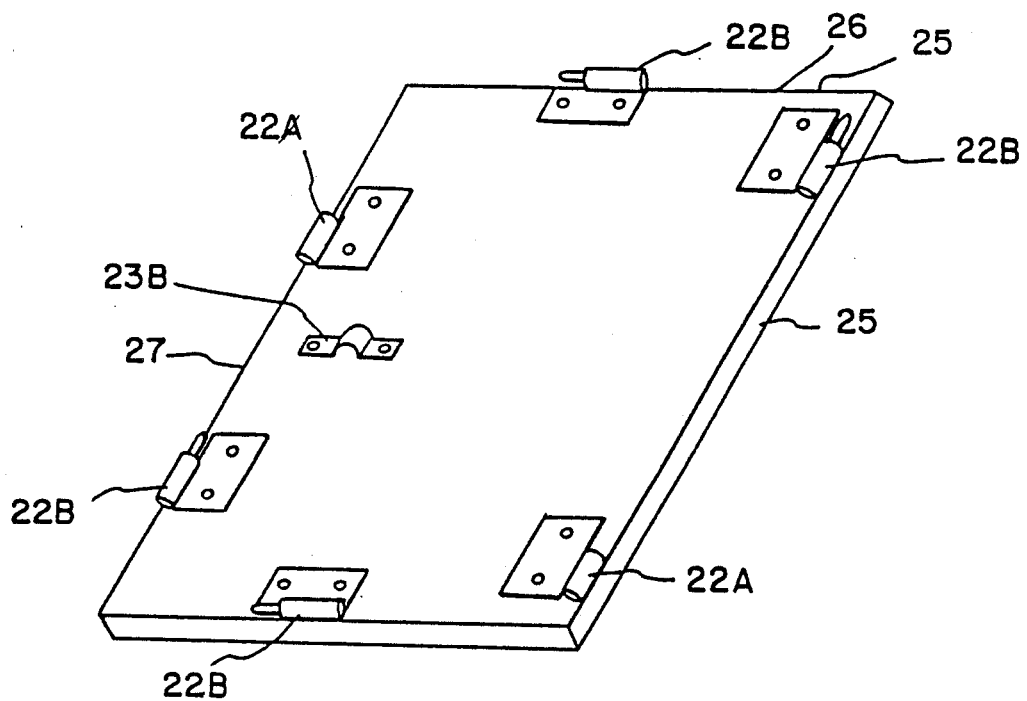
FIGS. 3A and 3B are views of the left and right side wall interiors.
Figure 3A:
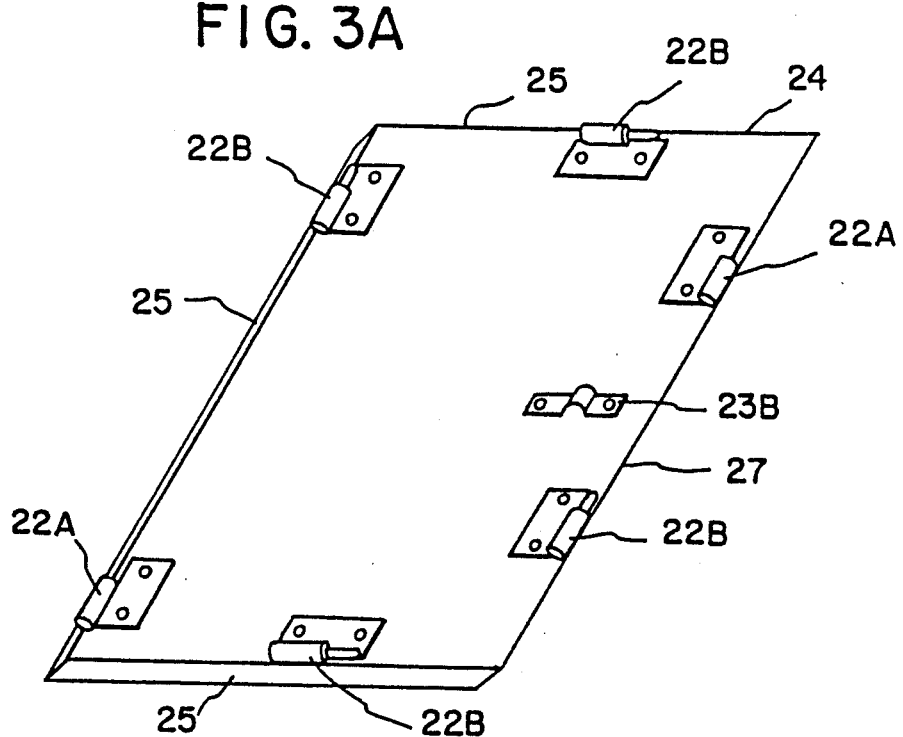

FIGS. 3A and 3B illustrate the structure of the interiors of right side wall 24 and of left side wall 26. Attached to the bottom interior of each side of the side wall sections are two half slip pin fasteners, one each of male (22B) and female (22A) of metal hinge 22, which will slideably engage half fasteners of their mates on floor panel 14 when assembled thereto. The upper interior of each side wall is also provided with two half slip pin fasteners one male (22B) one female (22A) as well as one hasp fastener and hook lock 23B. The interior sides of the side walls are provided with a half fastener 22B per side thereof.

Each of the side walls 24 and 26 has bevelled edges. The sides and bottom edges 25 bevel inwardly about 45 degrees while the top edges 27 bevel outwardly about 45 degrees. Each side wall is mounted in an upright position on the floor by joining the flooring and side walls at the bevelled edges and securing in place with half slip pin fasteners 22B into half slip pin fasteners 22A. Because of the bevelled edges in the joined sections, the rigidity and tightness of the structure is significantly increased.

Figure 4B:
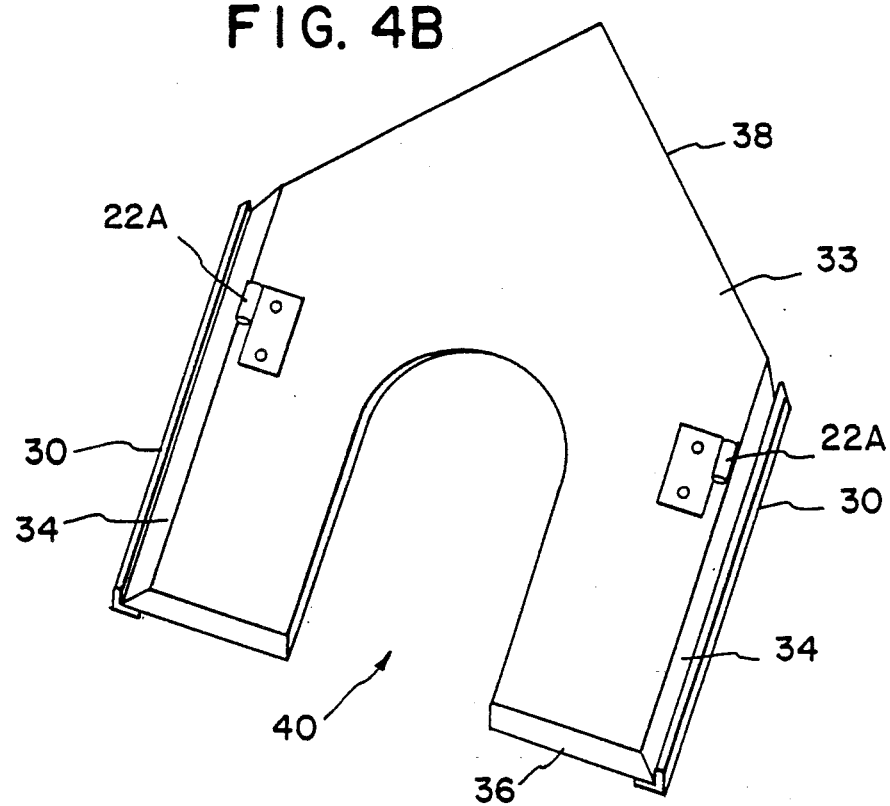
FIGS. 4A and 4B are views of the interior back wall section and of the interior front side wall section.
Figure 4A:
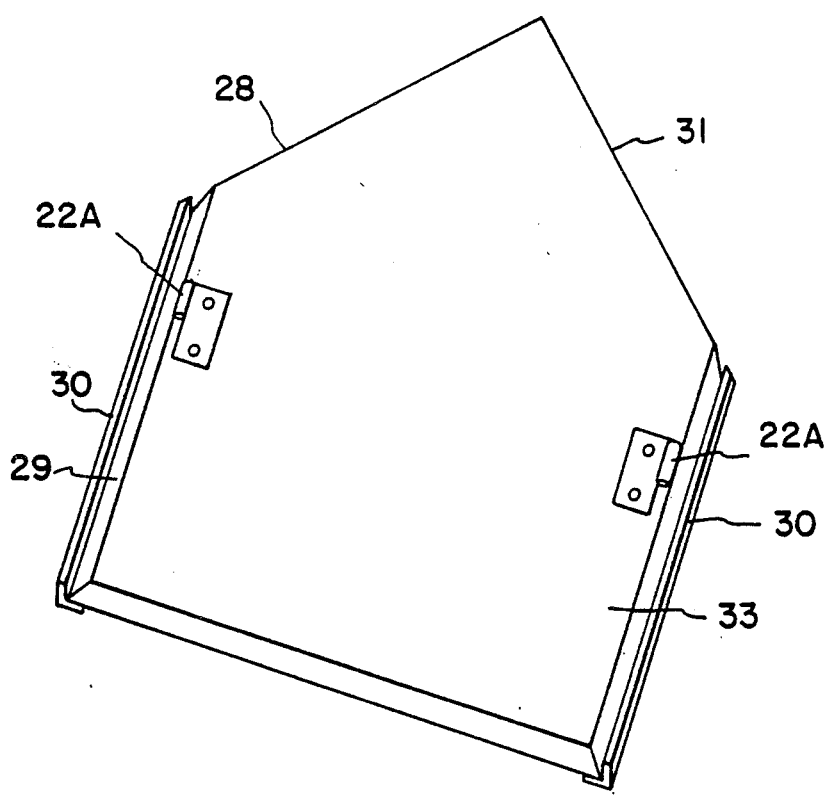

As seen in FIG. 4A, the end wall 28 interior includes side and bottom edges 29 bevelled inwardly at an angle of about 45 degrees while the gable edges 31 are cut at about 90 degrees square. A right angle shaped corner bead molding 30 about ½ inch by ½ inch is attached to the outside edge of each side by adhesive and/or staple or equivalent securing elements with about a ½ inch corner bead side molding overlapping the end wall as shown. The interior upper side areas are provided with half slip pin fastener 22A. A removable panel 32 can be provided to be hingedly attached to the back wall. Panel 33 can include cover screen 35 which is available to improve ventilation in warm weather conditions.

Back end wall 28 is attached to the structure by sliding it onto end edges 25 of side walls 24 and 26 and back end edge 20 of the floor panel. The bevelled side wall edges 25 and floor panel edges 20 are tightly fitted to bevelled side edges and bottom edges 29 of the end wall and within corner bead moldings 30. The end wall is secured in place by locking half slip pin fastener 22A onto half slip pin fastener 22B of the side walls.

FIG. 4B depicts the front end wall 32 interior. It is similar to the end wall in that side edges 34 and bottom edges 36 are bevelled inwardly at an angle 45 degrees and gable edges 38 are cut flat at about 90 degrees square; right angle shaped bead molding 30 is attached to the outside edge of each side; and the interior upper side areas are provided with slip pin fastener 22A. An entrance opening 40 is cut in the center of the front wall.

Front wall 32 is attached and secured to the structure in a similar manner as that of end wall 28. Front wall 32 is fitted tightly into the front ends of side walls 24 and 26 and floor panel 14 and within corner bead molding 30, and is secured in place by mating and locking male half slip pin fastener 22B with femal half slip pin fasteners 22A.

Figure 5B:
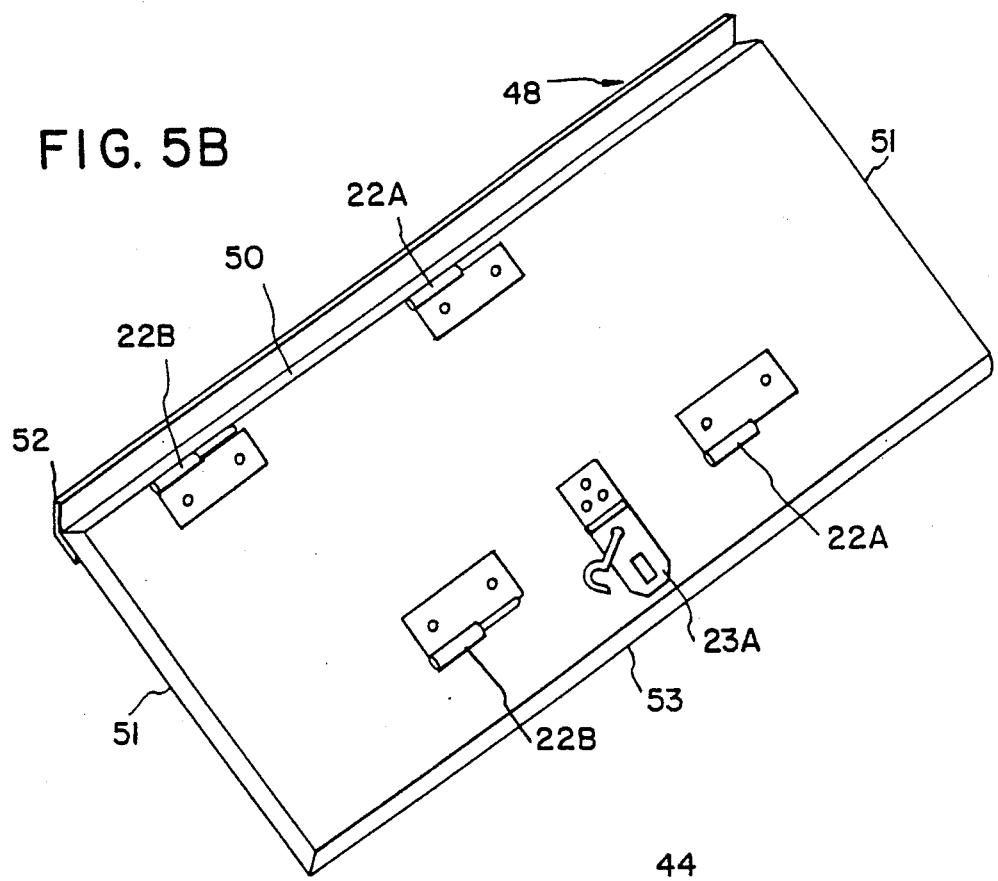
FIGS. 5A and 5B are views of the left and right side interiors of the roof sections.
Figure 5A:
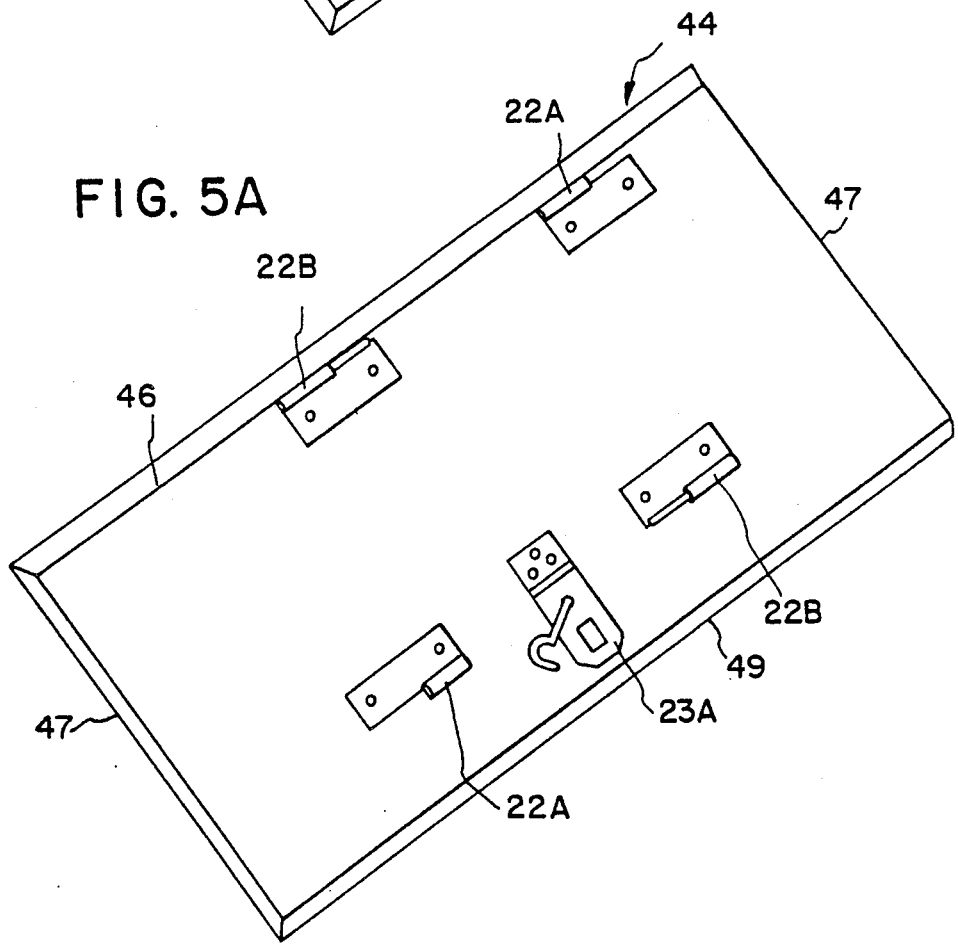
Figure 6B:
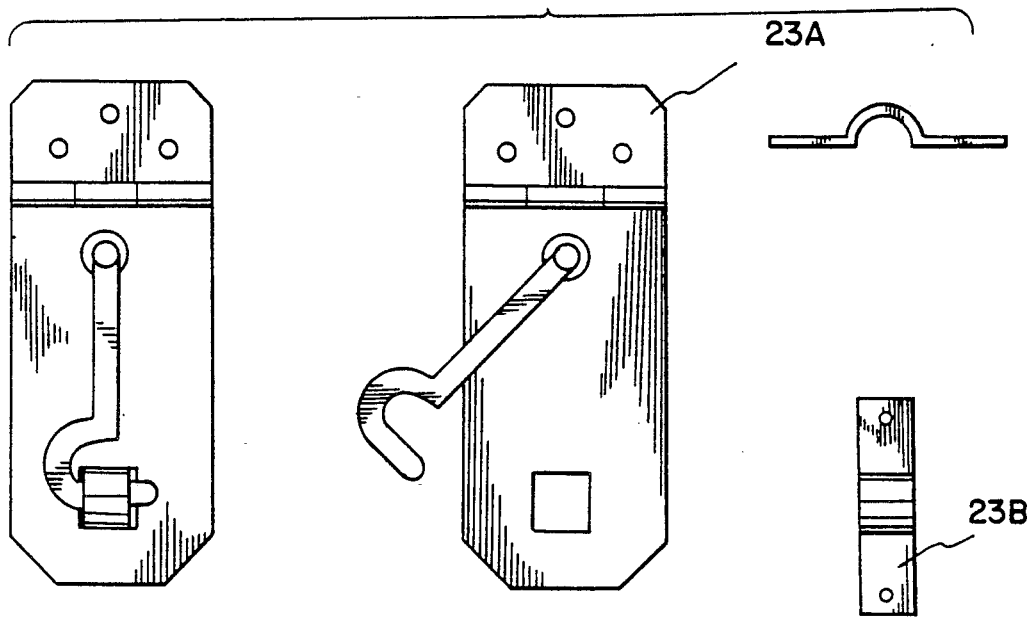
FIGS. 6A and 6B are views of hinges that can be used in the construction of the dog house.
Figure 6A:
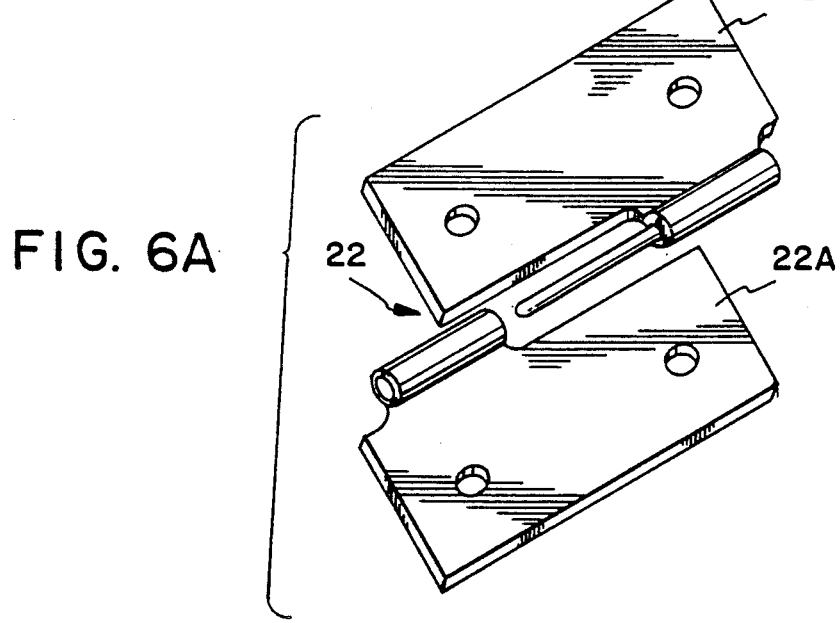

FIGS. 5A and 5B show roof structure 42. FIG. 5A shows the right roof panel 44 interior wherein the peak edge 46 is bevelled in at a 45 degree angle and the side edges 47 and drip edge 49 are cut flat at about 90 degrees square. Two half slip pin fasteners 22A and 22B are positioned below the peak interior and two half slip pin fasteners 22B and 22A are positioned above the drip edge interior wherein hasp fastener 23A is positioned between them.

Right roof panel 44 is attached by placing it onto the right side of the structure, resting its bottom interior surfaces on the top of the right side wall and on the top gable edges of the front and back end walls. The roof panel is secured in place by mating and locking half slip pin fasteners 22A and 22B on drip edge of the right roof side interior to half slip pin fastener 22B and 22A on the upper interior of the right side wall. Hasp fastener 23A is fastened through hook lock 23B located on the upper interior of the side wall.

FIG. 5B shows the left roof panel 48 to be similar to right roof panel 44 by having the peak edge 50 bevelled in at 45 degree angle and the side edges 51 and drip edge 53 cut flat at about 90 degrees square. Two half slip pin fasteners 22B and 22A are positioned below the peak interior and two more half slip pin fasteners 22B and 22A are positioned above the drip edge inerior with hasp fastener 23A. Triangular roof cap molding 52 is attached to, and overlaps, the peak edges as shown.

Left roof panel 48 is set in place on the left side of the structure in a similar manner to that of the right roof panel by resting its bottom interior surfaces on the left side wall and on the surfaces on the gable edges of the front and end walls. Roof cap molding 52 must fit over the bevelled peaks edge of the right roof panel. The hinge halves are mated and secured in place. Hasp fastener 23A is secured in hook lock 23B by reaching in through the door opening and doing so.

The structure is now assembled as shown in FIG. 1. It can be easily dismantled by reversing the above assembling procedure. An illustration of a dismantled structure is sketched in FIG. 7 showing how it can be assembled.

Figure 8:
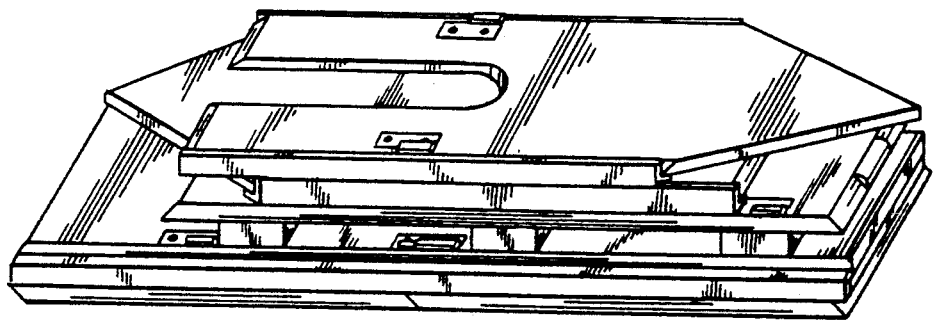
FIG. 8 is a view of the compactly stacked sections.

The dismantled structure forms a compact package when the section are staked together. A preferred method of stacking the sections shown in FIG. 8 includes:

Bottom
(1) right and left side walls (24 and 26) lying flat side-by-side with bevelled edges fitting together and interior facing upward,
(2) left roof panel 48 with interior facing downward,
(3) right roof panel 44 with interior facing upward,
(4) floor 12 with interior facing upward,
(5) back wall 28 with interior facing downward,
Top
(6) front wall 32 with interior facing upward.

The stacked sections now can be compactly packaged for storage or transport.

Figure 9:
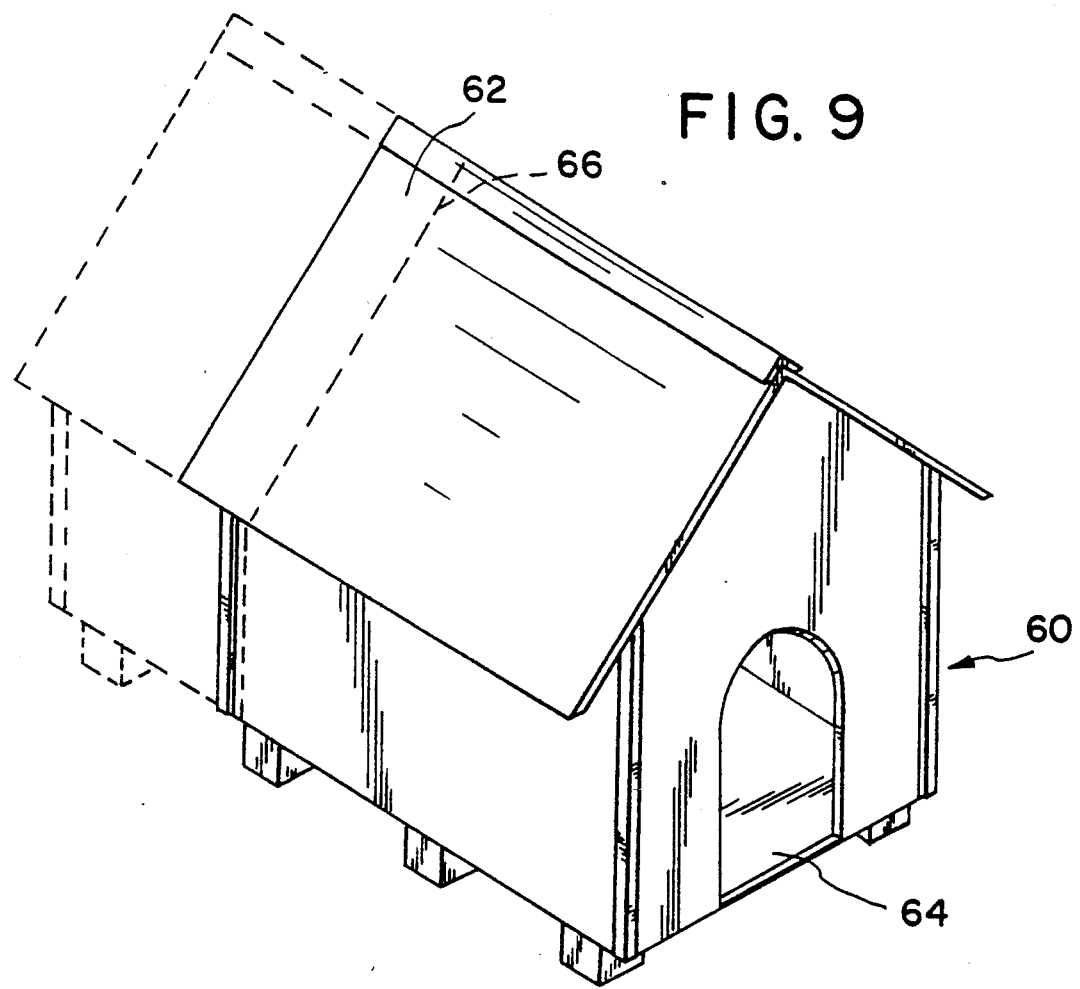
FIG. 9 is a view of dog house with an added compartment.

As a further embodiment of the invention, a modified dog house 60 can be provided to include an inner compartment 62 as shown in FIG. 9. The inner compartment or nesting area or bedroom can be of such a limited size that it can be warmed by the dog's body heat and prevents a draft in the cold weather. This is accomplished by extending the length of the doghouse by about ⅓, moving the front door opening 64 closer to the left side of the front section, then a partition 66 can be provided and have a door to the right side far enough back into the doghouse, from the front wall, to allow the dog to walk through the two doors to get to the "nest" area compartment.

. For improved ventilation in hot weather, there can be provided a screened rear window in the back of the doghouse which can be closed securely for cold weather.

Further, it will be apparent to those skilled in the art from the foregoing description and accompanying drawings that additional modification and/or changes of the disclosed embodiments may be made without departure from the invention. Accordingly, it is expressly intended that the foregoing description and accompanying drawings are illustrative of preferred embodiments only, not limiting, and that the true spirit and scope of the present invention be determined by the reference to the appended claim.

What is claimed is:

1. A prefabricated gable roof animal structure comprising seven separate prefabricated sections which can be quickly assembled and dismantled, each section having an internal and external surface having interlocking means possitioned to releasably engage adjacently connected sections, said interlocking means including releasably engageable male and female interlocking means, the assembled structure comprising a bottom floor section mounted on removable support means, two opposed upstanding side wall sections releasably connected to said floor section by said interlocking means, two opposed upstanding gable peaked front and end wall sections releasably connected by said interlocking means to said floor and said side wall sections, said front wall section having an opening for entrance and egress of an animal, two opposed gable roof sections connected to each other and to said side wall sections by said interlocking means, said seven separate sections when assembled are rigidly secured in place internally by said interlocking means forming a solid unit structure with means for restricting outward rotation of adjacent sections.

2. An animal structure according to claim 1 wherein the sections are formed from ½ inch indoor-outdoor plywood.

3. An animal structure according to claim 1 wherein said floor section is mounted on six blocks removably attached thereto.

4. An animal structure according to claim 1 wherein walls and roof sections are protected by mouldings externally covering connected joined edges.

5. An animal structure according to claim 4 wherein said moldings are partially attached to connecting sections so as to overlap onto adjacent sections during assembly of the structure.

6. An animal structure according to claim 1 wherein the connected sections have opposing bevelled edges.

7. An animal structure according to claim 1 wherein said interlocking means comprise several metal slip pin fasteners and two hasp fasteners and hook locks.

8. An animal structure according to claim 1 wherein said structure can be quickly dismantled.

9. A dismantled structure according to claim 8 wherein, dismantled sections are stacked one on another to form a compact package.

10. An animal structure according to claim 1 wherein said front wall section includes a center entrance opening.

11. An animal structure according to claim 1 wherein an inner compartment can be added to the structure.

12. An animal structure according to claim 11 wherein said inner compartments can be connected through a partition.

13. An animal structure according to claim 12 wherein said front wall section provides an entrance opening on one side.

14. An animal structure according to claim 13 wherein said compartment extends the length of the structure by about ⅓.

15. An structure according to claim 1 wherein said end wall section can provide a ventilated opening.

16. An animal structure according to claim 7 wherein said slip pin fasteners are positioned internally on adjacent sections.

17. An animal structure according to claim 16 wherein said hasp fasteners and hook locks are positioned internally on adjacent side wall and gable roof sections.

18. An animal structure according to claim 17 wherein said connected sections of the floor section with the wall sections, of the side wall sections with the front and end wall sections, and of the roof sections at the peak have opposing bevelled edges.

19. An animal structure according to claim 18 wherein said roof sections overlap said wall sections.

* * * * *